UNITED STATES PATENT OFFICE.

CLARENCE ROSCOE KING, OF WORCESTER, MASSACHUSETTS, ASSIGNOR TO NORTON COMPANY, OF WORCESTER, MASSACHUSETTS, A CORPORATION OF MASSACHUSETTS.

METHOD OF MAKING ABRADING-TOOLS.

1,394,500. Specification of Letters Patent. Patented Oct. 18, 1921.

No Drawing. Application filed November 4, 1918. Serial No. 261,106.

*To all whom it may concern:*

Be it known that I, CLARENCE ROSCOE KING, a citizen of the United States of America, residing at Worcester, in the county of Worcester and State of Massachusetts, have invented certain new and useful Improvements in Methods of Making Abrading-Tools, of which the following is a full, clear, and exact specification.

My invention relates to abrading tools and more particularly to a method of making tools of abrasive grains bonded together by means of vulcanized substances.

In the manufacture of a rubber bonded abrading tool, abrasive grain is embedded in rubber and the latter vulcanized. This process, however, is not merely one of vulcanizing rubber, since it must be so carried on that the bond will not lose its intimate contact with the abrasive grain after vulcanization has been completed. The adhesive forces involved must be sufficiently large to hold the grain in the surface of the wheel under ordinary grinding strains, and prevent its being torn out too rapidly before it can accomplish its abrading function.

In accordance with the methods previously used for making such a grinding tool, sulfur is first mechanically worked into a rubber bond, and the mass then rolled with a quantity of abrasive grains to embed the latter uniformly in the rubber. The mass must then be compressed under hydraulic pressure in a press ordinarily heated by steam, for a period of 2 to 4 hours before vulcanization can be effected. The partial vulcanization thus effected in the press is necessary to prevent the wheel swelling, cracking or otherwise becoming defective during the final vulcanization process. As a result, the process has been slow, expensive and difficult to carry out. In fact, it has been generally impossible to obtain uniform vulcanization or to carry on the process to completion. Consequently the products have varied in their physical nature and many of the wheels have been found defective, so that the wheel inspectors have been obliged to throw out a large percentage of each batch as being inferior goods.

It is accordingly an object of my invention to simplify and lower the cost of the manufacture of tools which are made of abrasive grains bonded together by a vulcanizable material, decrease materially the time consumed in the press operation, effect a complete vulcanization and otherwise provide a feasible method of manufacturing such abrading tools, so that they will come through the process uniform in composition and grinding characteristics, and produce better grinding results than heretofore obtainable with tools of this type.

With this and other objects in view as will appear from the following disclosure my invention resides in the steps of the process as set forth in the specification and covered by the claims appended hereto.

In the course of my experimentation, I have corrected these difculties by varying the process as hereinafter set forth. By employing a catalytic material with the vulcanizable bond, not only is the vulcanization action accelerated but tne necessity for using the heated press is unexpectedly eliminated. For such a catalytic material, I have found that the various organic rubber vulcanization accelerators which contain nitrogen in their molecular construction are adapted for this purpose. A brief review of the organic accelerators involved in this art may be found on page #190 of *The India Rubber World*, published January 1, 1917. Of these materials, I find that para-nitroso-dimethyl-anilin, or its acid salts is best adapted for my purposes.

I find that the operation of heating the vulcanizable mass and subjecting it to hydraulic pressure in a heated press for 2 to 4 or more hours may be eliminated and that a high class product may be obtained by subjecting the mass at ordinary temperatures to high pressure for a few minutes only, this step serving the purposes merely of com pressing the relatively loose mass to the desired density and molding it to the proper form for use as a grinding tool.

As a specific example of my process, the following steps may be carried out in making a wheel having a rubber bond vulcanized by means of sulfur or a sulfur compound. The crude rubber, the vulcanizing sulfur and the accelerating compound, which may be para-nitroso-dimethyl-anilin or its salts, are mixed together and abrasive grain intimately incorporated in the mass, in any desired sequence of steps. Any suitable apparatus may be utilized for this purpose, although I prefer mixing rolls. Crude rubber is passed repeatedly between these heavy mixing rolls, which are preferably steam heated to render the rubber somewhat plastic, and the vulcanizer and catalytic material are added thereto in small proportions, while abrasive grain, such as silicon carbid or crystalline alumina, is forced into the rubber by the pressure of the rolls. When the material has been sufficiently mixed and it has been rolled out into strips of uniform thickness, it may then be cut into disk form to correspond with the size of the wheel to be made. For a thin wheel, the disks may be made up in a single layer considerably thicker than the final size, and if a thick wheel is to be made, a plurality of strips are piled one on top of the other to build up the wheel. These disks are then placed in an iron mold having plates adapted to fit closely but movably within the mold whereby the mass may be compressed to the desired thickness.

In accordance with my invention, it is not necessary to preheat the rubber mass, although it may be permitted to retain any residual heat absorbed during the mixing operation. The mold is placed in a cold press and the plates are forced inwardly under heavy pressure, such as one ton per square inch of surface, this pressure being continued for but a few minutes. Upon removing the mold from the cold press, I fasten the plates in place by suitable means. The mold is then placed in an oven heated by any suitable agency, such as steam, and the vulcanization operation is carried on in the usual manner. This operation consumes from 10 to 20 hours, after which the wheel is then ready for truing to the correct form and size. While I prefer to use a cold press, as above described, I may press the material under the action of heat without injuring the product, although such a step is entirely unnecessary.

By my invention, I cut down the time of pressing the wheels to a remarkable extent, it now being feasible to utilize but a few minutes of pressure whereas previously it wasted a large portion of a working day. Furthermore, by adding the catalyzer I am enabled to carry on the vulcanizing operation to completion due to the effect of the pressing operation and thus obtain a uniform quality of wheel, whereas under the old method a great many second-class wheels were frequently found and had to be thrown out. The total time of the pressing operation may be decreased as much as 90 per cent. by utilizing my invention, hence the cost of manufacture is greatly lowered. I am therefore enabled to simplify the process and to make a wheel of better grade and more uniform characteristics, and in fact a wheel which gives better grinding qualities and lasts much longer than those heretofore made.

I claim:—

1. The method of making abrading tools, comprising mixing sulfur, a vulcanization accelerating compound, and abrasive grains with rubber while heating the rubber to render it more plastic, subjecting the mass to high pressure for a few minutes to shape the tool and thereafter vulcanizing the bond for several hours in a single heat treatment, while confining the mass to prevent deformation thereof.

2. The process of making abrading tools, comprising mixing abrasive grain with a bond of rubber, sulfur and a vulcanization accelerator, shaping the mass by compacting it in a mold under high pressure for a short time at ordinary temperatures, confining the shaped mass to prevent deformation and thereafter completely vulcanizing the bond in one heat treatment in the absence of high external pressure.

Signed at Worcester, Massachusetts, this 31st day of Oct. 1918.

CLARENCE ROSCOE KING.